United States Patent
Wittenbecher

(10) Patent No.: US 7,989,728 B2
(45) Date of Patent: Aug. 2, 2011

(54) METHOD AND DEVICE FOR PRODUCING A TEAR LINE IN A VEHICLE INTERIOR TRIM PART

(75) Inventor: Wolfgang Wittenbecher, Gumperda (DE)

(73) Assignee: Jenoptik Automatisierungstechnik GmbH, Jena (DE)

( * ) Notice: Subject to any disclaimer, the term of this patent is extended or adjusted under 35 U.S.C. 154(b) by 750 days.

(21) Appl. No.: 12/119,619

(22) Filed: May 13, 2008

(65) Prior Publication Data

US 2008/0290075 A1  Nov. 27, 2008

(30) Foreign Application Priority Data

May 24, 2007 (DE) .......................... 10 2007 024 510

(51) Int. Cl.
*B23K 26/36* (2006.01)

(52) U.S. Cl. ......... 219/121.62; 219/121.68; 219/121.69; 219/121.7; 219/121.71; 219/121.83; 442/59; 280/728.3; 425/141; 425/174.4; 264/400

(58) Field of Classification Search ............. 219/121.61, 219/121.62, 121.68–121.71, 121.83; 280/728.1, 280/728.3; 442/59; 53/412, 462; 264/400; 425/141, 174.4

See application file for complete search history.

(56) References Cited

U.S. PATENT DOCUMENTS

| | | | | |
|---|---|---|---|---|
| 5,353,985 | A | * | 10/1994 | Nageli et al. ............... 229/123.1 |
| 5,882,572 | A | * | 3/1999 | Lutze et al. .................... 264/400 |
| 5,883,356 | A | * | 3/1999 | Bauer et al. .............. 219/121.62 |
| 5,932,003 | A | * | 8/1999 | Naomoto et al. ................ 117/44 |
| 5,968,381 | A | * | 10/1999 | Nusshor .................... 219/121.69 |
| 6,294,124 | B1 | | 9/2001 | Bauer et al. |
| 6,423,933 | B2 | * | 7/2002 | Nicholas et al. ........... 219/121.7 |
| 6,680,459 | B2 | * | 1/2004 | Kanaya et al. .............. 219/121.7 |
| 7,284,975 | B2 | * | 10/2007 | Morita .......................... 425/142 |
| 2002/0099511 | A1 | * | 7/2002 | Matsushita et al. ........... 702/104 |
| 2006/0231536 | A1 | * | 10/2006 | Griebel et al. ........... 219/121.71 |

FOREIGN PATENT DOCUMENTS

| | | |
|---|---|---|
| DE | 10 2005 054 607 A1 | 5/2007 |
| EP | 0 827 802 B1 | 5/2000 |
| EP | 0 711 627 A2 | 7/2000 |

* cited by examiner

*Primary Examiner* — Samuel M Heinrich
(74) *Attorney, Agent, or Firm* — Duane Morris LLP

(57) ABSTRACT

A method and a device for producing a tear line in a vehicle interior trim part, in which a laser beam is guided along a tear line and a material ablation in the form of holes with a residual wall thickness is effected. On the side facing the laser beam, the complete extent of the tear line is detected by a stationary matrix camera. In the machining at a machining site, only pixels of a CMOS matrix camera that are known in advance, for which the incidence of a measurement radiation is expected at this machining site, are read out. The laser is preferably scanned and non-adjacent machining sites are machined successively.

11 Claims, 1 Drawing Sheet

METHOD AND DEVICE FOR PRODUCING A TEAR LINE IN A VEHICLE INTERIOR TRIM PART

FIELD OF THE INVENTION

The invention relates to a method and a device for weakening the inner side of a vehicle interior trim part along a tear line that is defined on the vehicle interior trim part of an airbag cover and tears in case of the activation of an airbag arranged behind it in order to open a passage opening for deployment of the airbag into the passenger compartment.

BACKGROUND OF THE INVENTION

Such a method, and a device suitable for it, are known according to the present generic type from EP 0 711 627 B1.

A number of methods are known from the prior art with which tear lines can be produced by means of lasers in vehicle interior trim parts with an integrated airbag. They differ, among other respects, by the different measures that are taken to create a tear line that is first of all, not perceptible from the exterior of the vehicle interior trim part and, second, has an optimal, defined and reproducible tearing resistance along its length.

According to the two publications below, these two problems are solved by performing a material ablation along the tear line, with a measurement value relevant to the residual wall thickness being determined and the laser being controlled such that a defined residual material thickness is preserved underneath the ablation volume.

According to EP 0 827 802 B1, a residual wall thickness (material thickness) is assured by detecting the transmitted radiation from the exterior with a sensor. For this purpose, the sensor must be arranged on the optical axis of the laser directed at the vehicle interior. No information is given for realizing the relative movement between the laser beam and the vehicle interior trim part necessary for producing the tear line. In practice, when using a laser cutting system, such as VOTAN A manufactured by JENOPTIK AG of Jena, Germany, to perform the method of this patent, the vehicle interior trim part is moved and the laser and sensor remain stationary.

The laser beam and the sensor could also be moved relative to the vehicle interior trim part. In order to ensure a stable position of the laser beam, it would be necessary to create a mechanically stable connection between a robot arm guiding the laser beam and the sensor, which would leave only a limited range of movement. Movement of the laser beam by means of a scanner would require an additional drive unit to synchronize the movement of the deflection elements of the scanner with the movement of the scanner.

These difficulties do not exist in a solution according to EP 0 711 627 B1, in which a sensor is used that covers the work field of the laser beam and therefore need not be moved along with it, but can instead remain stationary.

In an embodiment for a method and a device described in the above document, the vehicle interior trim part is held on an ultrasound sensor and the laser beam is guided along the tear line, the ablation being performed in the form of a continuous groove or a series of perforations (blind holes). The ultrasound sensor detects signals corresponding to the thickness of the material and thus supplies a feedback signal to a central computer in order to modify the position of the laser generator and/or its output power and thus control the thickness of the material remaining after the notching.

A solution according to EP 0 711 627 B1 is advantageous compared to the solution according to EP 0 827 802 B1 to the extent that the sensor and the vehicle interior trim part are held stationary. The movement of only the laser beam allows, if necessary, a higher positioning speed between the laser beam and the respective machining site on the tear line. The unrestricted functioning of an extensive ultrasound sensor according to EP 0 711 627 B1 is doubtful, however. A prerequisite would be that the sensor surface be in air-free contact with the surface of the vehicle interior trim part. This becomes difficult particularly if the surface of the vehicle interior trim part has a three-dimensionally extended free-form surface or even if its surface has a structured height profile.

SUMMARY OF THE INVENTION

The present invention is based on the problem of creating a different method and a device suited thereto in which a sensor, other than an ultrasound sensor, is used for detecting the residual wall thickness.

This problem is solved by providing a method having the characteristics of claim 1 and by providing a device having the characteristics of claim 8. Advantageous refinements of the invention are described in the subordinate claims.

BRIEF DESCRIPTION OF THE DRAWINGS

The method and the device of the present invention will be described below, by way of example, according to the annexed drawings, in which.

DESCRIPTION OF AN EMBODIMENT

Figure 1:
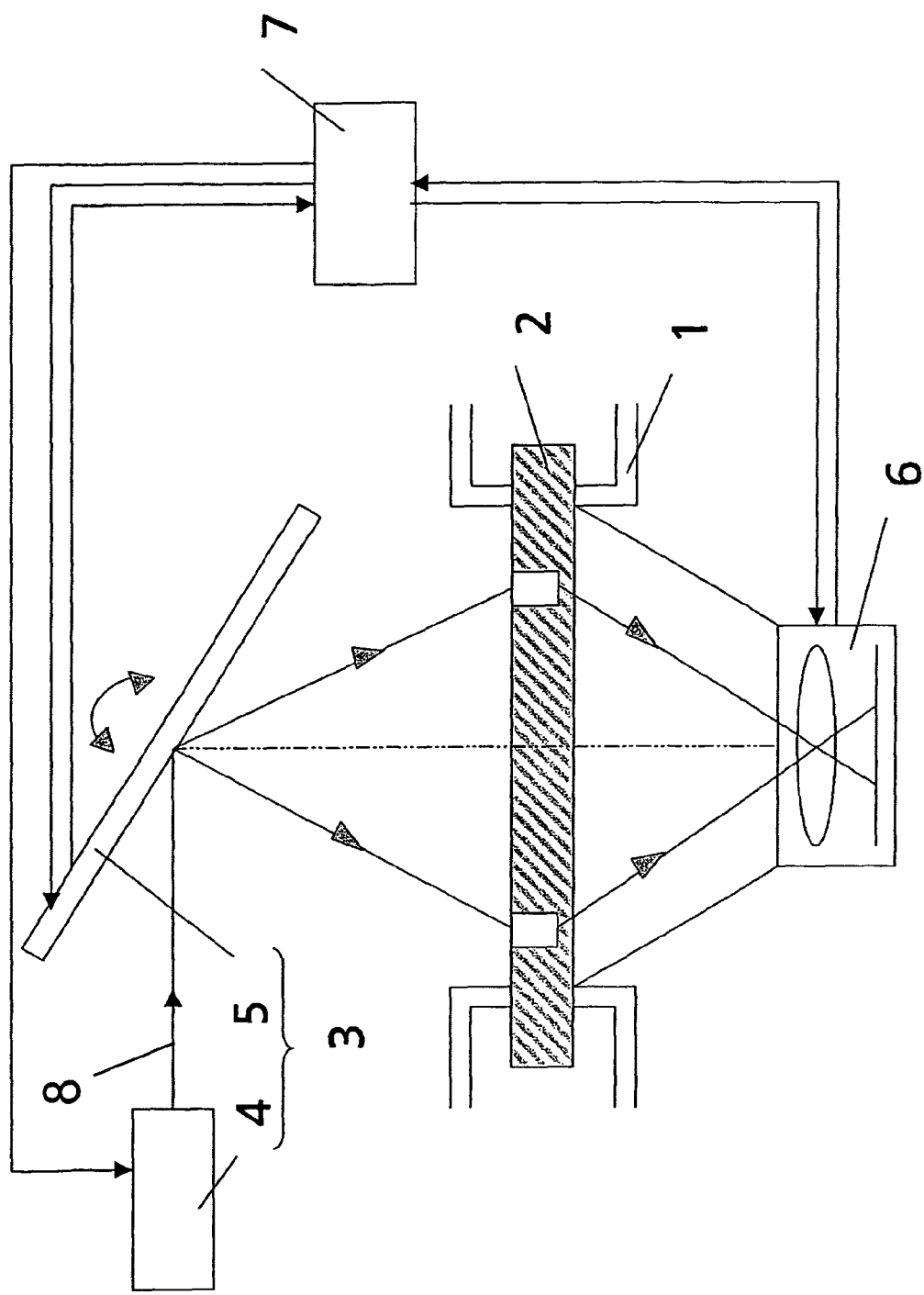
FIG. 1 shows a sketch of the principles for the device of the invention.

A device of the invention is shown in FIG. 1. It comprises a holding unit 1 in which a vehicle interior trim part 2 is held, a laser unit 3 consisting of a laser generator 4 and a beam guiding unit, a laser scanner 5, a stationary matrix camera, a CMOS matrix camera 6 in this case, and a control and computation unit 7.

Laser scanner 5 is positioned with respect to holding unit 1 in such a way that its working field, determined by the displacement paths of the angle of tilt of its deflection elements, completely covers the designated tear line of a vehicle interior trim part 2 held in holding unit 1, and the laser beam 8 is pointed on the interior side of vehicle interior trim part 2 at the latter.

CMOS matrix camera 6 is arranged with respect to holding unit 1 in such a manner that its field of view, determined by the size of the matrix, allows complete imaging of the designated tear line. In order to make this imaging completely possible, beam-deflecting and/or beam-shaping optics can be provided in front of CMOS matrix camera 6.

Control and computation unit 7 is connected via signal lines to laser generator 4, laser scanner 5 and CMOS camera 6. It serves to drive laser generator 4 and laser scanner 5, as well as to process and store the read-out voltage signals of CMOS matrix camera 6.

In order to perform the method, reference data for all machining points along the tear line for vehicle interior trim part 2 to be machined are stored in control and computation unit 7. The machining points can be driven in succession or according to a predetermined operating regime.

The reference data comprises, associated with each machining site, location data for identification of the individual sensors (pixels) of CMOS matrix camera 6 for which an exposure to radiation at the respective machining site is expected during machining, reference measurement values relating to the signal strength caused by the radiation impinging on the pixels when a predetermined residual wall thickness has been reached, position data of the deflecting element of laser scanner 5 at which the laser radiation is directed onto the machining site.

The reference measurement values can be different for individual machining sites. This is even necessary if the machining sites lie at different distances from CMOS matrix camera 6 for a three-dimensionally shaped vehicle interior trim part 2, and thus the intensity loss over the distance to the camera differs.

The reference measurement values are obtained by surveying or test machining of reference vehicle interior trim parts and are stored in association with the respective machining site.

The individual sensors of a CMOS matrix camera 6, which are arranged in a matrix, i.e., in columns and rows, are active pixel sensors, from which the voltage signal induced by the radiation intensity for each pixel can be read out directly. As a result of advance knowledge of the pixels, each of which can presumably be subjected to radiation at a given machining site, only those pixels are read. A CMOS matrix camera 6 is not suitable for detecting heat radiation due to its low IR sensitivity. There will possibly be matrix cameras in the future with which IR radiation can also be detected and the induced voltage signals directly read out for each individual pixel. It is essential to the invention that the CMOS matrix camera 6 that is used consist of a variety of pixels that can be read out individually and form an image plane on which the complete extent of the tear line can be imaged. Such a CMOS matrix camera 6 is ideally sensitive only over a narrow range including the measurement radiation, which can be realized by the use of appropriate filters in the camera optics.

Ordinary CMOS matrix cameras 6, however, are sensitive to all visible light, for which reason it is necessary to screen out all stray light. CMOS matrix camera 6 is therefore housed in a light-tight chamber that is closed off by the part of the vehicle interior trim part 2 in which the tear line is to be formed.

Since the radiation intensity decreases with the square of distance, and only very low intensities to be detected are involved, one would like to position CMOS matrix camera 6 as close behind the outer side as possible. On the other hand, the receiving surface (matrix) is substantially smaller than the object surface that the tear line must completely surround, whereby a minimum distance results as a function of the camera's angle of aperture. Alternatively, several cameras can be used, each imaging only sub-regions of the tear line, and thus can be placed closer to one another.

The method will be explained below on the basis of an embodiment.

After vehicle interior trim part 2 has been fixed on holding unit 1 and CMOS matrix camera 6 arranged light-tightly with respect to it, the deflection elements of laser scanner 5 are positioned such that a laser beam 8 coming from laser generator 4 is directed at a first machining site on the predetermined tear line of the vehicle interior trim part 2.

Laser generator 4 is turned on, and the laser radiation strikes the first machining site, where a hole is produced with increasing depth down to a specified residual wall thickness. Corresponding to the position data correlated with this first machining site, precisely those pixels which radiation induced at this first machining site can strike are read out.

The detection of the machining laser radiation, i.e., a portion of laser beam 8 transmitting through the material, is advantageous.

Depending on the detection properties of CMOS matrix camera 6, the detected radiation (measurement radiation) can also be auxiliary radiation, heat radiation resulting from the machining, or induced plasma radiation.

The radiation intensity striking the active pixels is integrated via these pixels over space and over a predetermined time window, and is compared with reference measurement value stored for this machining site. The measurement is repeated until the reference measurement value is achieved. Then laser generator 4 is switched off.

The deflection elements of laser scanner 5 are then moved according to the position data for a second machining site into an additional position, so that laser beam 8 strikes vehicle interior trim part 2 at the second machining site. The process is repeated as described for the first machining site until a hole has been produced at all machining sites.

In the first embodiment, the deflection elements of laser scanner 5 remain in their respective positions while laser scanner 4 is turned on. In this way a round hole independent of the machining time arises. Due to the high possible positioning speed, i.e., the speed for going from one machining site to the next, which can be achieved by a laser scanner 5, the process duration for guidance of laser beam 8 via a laser scanner 5 can be markedly shortened in comparison with a continuously guided laser beam 8, despite its remaining in place during machining, even if the machining time for an individual hole is increased in favor of a lower laser power.

A second embodiment differs from the first in that the radiation unit is a driven robot arm that is connected to laser generator 4. The robot arm describes a uniform motion along the foreseen tear line. Just as in the first embodiment, laser generator 4 is turned on whenever laser beam 8 arrives at a machining site. Unlike the first embodiment, laser beam 8 is to be moved continuously during the ablation process. In order for the hole being formed to differ only as little as possible from a circular form in cross section, the laser power and the advancement speed must be matched to one another. That is, for the sake of lower laser power, the advancement speed must also be selected to be relatively slow, since elongated holes are otherwise formed. Hence the positioning speed is also low in comparison with the first embodiment. This second embodiment is limited to being able to machine only machining sites adjacent to one another.

In order for a web to be retained between the holes in order to support a cover layer of a multilayer structure of vehicle interior trim part 2, the blind holes are produced with a minimum spacing. In the machining of adjacent machining sites, the thermal stress already exerted at the second site as a result of the machining at the first site must be considered in the selection of this minimum spacing. The thermal stress can be reduced if one does not machine adjacent holes one after the other, but rather holes remote from one another successively according to a predetermined regime, which allows cooling at the respective machining site.

A method according to the invention is particularly advantageous for such a machining regime, since the workpiece, i.e., vehicle interior trim part 2, and the sensor, a CMOS matrix camera 6 in this case, remain stationary, and thus the rapid movement of laser beam 8 via laser scanner 5 can be completely exploited. For instance, such a predetermined operating regime for 400 holes to be produced could run in a cycle 1+n, 50+n, 100+n, 150+n, where $1 </= n >/= 48$. After the respective first hole of a cycle has been produced, this machining site can cool down for three times the time for a hole before an adjacent hole is produced.

How large the residual wall thickness should be for the tearing resistance not to become too large but at the same time for the tear line not to be perceptible depends on the strength of the material (for a multilayer material, the strength of the cover layer), the line pattern of the tear line and the surface structure. The residual wall thickness need not be maintained completely across the hole cross section, i.e., the hole, which is in principle a blind hole, could also be constructed as a micro-perforation hole.

LIST OF REFERENCE NUMBERS

1 Holding unit
2 Vehicle interior trim part
3 Laser unit
4 Laser generator
5 Laser scanner
6 CMOS matrix camera
7 Control and computation unit
8 Laser beam While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

The invention claimed is:

1. A method for producing a tear line in a vehicle interior trim part comprising, directing a laser beam along a tear line on the interior side of a vehicle interior trim part mounted stationarily in a holding unit thereby effecting a material ablation in the form of holes with a residual wall thickness at a plurality of machining sites along the tear line; detecting measurement values that are equivalent to the residual wall thickness over the complete extent of the tear line by a stationary sensor; and controlling a laser generator emitting said laser beam as a function of the measurement values in comparison with at least one reference measurement value; wherein said measurement values are voltage values that are formed by the intensity of a measurement radiation induced at the respective machining site that falls on pixels of a matrix camera that are known in advance, and the voltage values of only these pixels are read out.

2. The method according to claim 1, wherein said measurement radiation is a part of said laser beam.

3. The method according to claim 1, wherein said measurement radiation is additional auxiliary radiation.

4. The method according to claim 1, wherein said measurement radiation is infrared radiation.

5. The method according to claim 1, wherein said measurement radiation is plasma radiation.

6. The method according to claim 1, wherein holes laying one after the other, but not one next to the other, are machined in order to allow a cooling of a previous machining site.

7. The method according to claim 6, wherein said laser beam is guided by scanning.

8. A device for producing a tear line that is formed by holes at different machining sites in a vehicle interior trim part comprising, a laser unit having a laser generator and a beam guidance unit; a holding unit in which said vehicle interior trim part is held with its interior side facing said laser unit; a stationary-mounted sensor mounted on the exterior side of said trim part, the measurement area of which covers the entire tear line; and a control and computation unit connected in terms of signal technology to said sensor and to said laser generator; wherein said sensor is a matrix camera, the pixels of which can be read out individually, and said control and computation unit is designed to store the position data correlated with the individual machining site from the pixels for which it is anticipated that they will be subjected to radiation at the respective machining site in order to effect a readout of only these pixels.

9. The device according to claim 8, wherein said matrix camera is a CMOS matrix camera.

10. The device according to claim 8, wherein instead of one matrix camera, several matrix cameras are arranged, the measurement areas of which each cover subregions of the tear line.

11. The device according to claim 8, wherein said beam guidance unit is a laser scanner.

* * * * *